Aug. 1, 1950     C. T. TORRESEN     2,517,364

FASTENER ADJUSTER

Filed Jan. 22, 1945

INVENTOR.
Carel T. Torresen

Patented Aug. 1, 1950

2,517,364

UNITED STATES PATENT OFFICE 2,517,364

FASTENER ADJUSTER

Carel T. Torresen, Santa Monica, Calif.

Application January 22, 1945, Serial No. 573,934

3 Claims. (Cl. 85—1)

This invention relates to improvements in fasteners, more particularly to fasteners applied to aircraft cowling.

Aircraft cowling comprises that portion of the skin covering requiring ready removal or replacement.

To provide for the ready removal or replacement of cowling, the fasteners themselves have generally been of the slotted bayonet stud type. The common bayonet type fastener permits ready fastening of the cowling to the aircraft structure, but suffers in the spring and slotted bayonet stud type fastener of particularly wide initial cowl separation from its supporting structure because of the inherent resiliency or weakness of the spring. Other types of fasteners employing a crosspin type stud and a semi-rigid spring may overcome the fault of wide cowl separation. However, this type of fastener may not accommodate more than small variation in material thicknesses being joined. Individual selection at assembly to the cowl itself may then be necessary for good result.

Increase of aircraft speeds, with consequent increase in dynamic and other forces applied to the cowling, require that joint deflection between the supporting structure and the cowling be held to a minimum and with the goal complete elimination of joint deflection. It is further desired that fasteners be provided with a means for adjustment after installation in order to obviate the need for selection or for the addition of shims and the like. It is further desired that the fastener be a self contained unit and not require separate additional members to attain requisite strength to resist deflection, or for purpose of adjustment.

It is still further desired that the fastener provide for a degree of misalignment to accommodate required manufacturing tolerances in cowling, fastener or both.

The improvements in my fastener comprise a threaded substantially flat sided or externally grooved bayonet stud, a floating bayonet nut and an adjustment for positioning the nut axially in increments of the thread pitch, such that the fastener may be drawn up tight regardless of variation in cowl and support structure thicknesses, yet permitting a degree of misalignment of fastener assembly.

Figure 1:
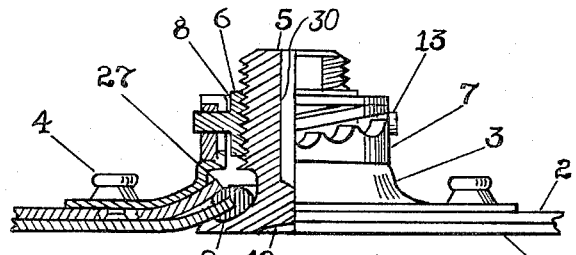
Figure 2:
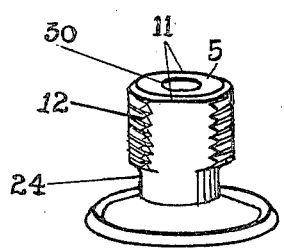
Figure 3:
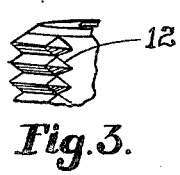
Figure 4:
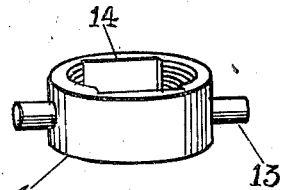
Figure 5:
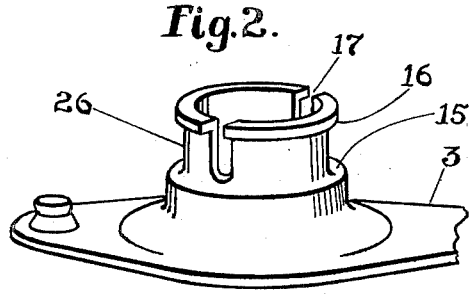
Figure 6:
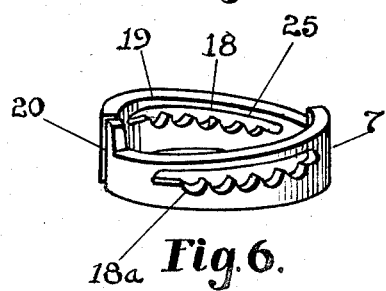
Figure 7:
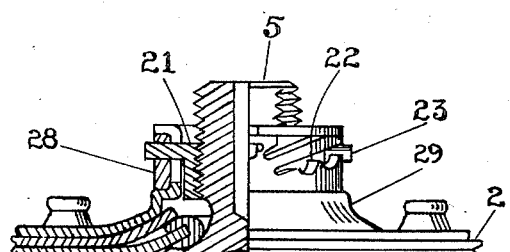
Figure 8:
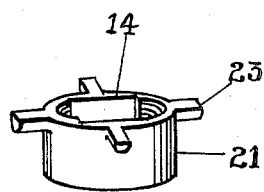

The invention will be more fully described in the following description and with references to the drawing, in which, Figure 1 is an assembly view of the fastener shown partly in cross section.
Figure 2, side elevation of the stud.
Figure 3, an enlarged portion of the stud thread.
Figure 4, detail of the nut shown in Figure 1.
Figure 5, the fastener receptacle.
Figure 6, nut adjuster.
Figure 7, a modification of the fastener assembly, view shown partly in section.
Figure 8, a modified form of the nut.

In Fig. 1, cowl sheet 1, in which stud 5 is loosely retained at neck portion 24 by grommet 9, is attached to the supporting structure 2 to which has been riveted fastener receptacle 3 by rivets 4 and containing trunnioned nut 6 and adjustor 7, by causing stud 5, flattened as at 11, Fig. 2, to slide along cutaway thread portion shown as 14 in Fig. 4 until cowl sheet 1 is rested against structure 2. Stud thread cutaway portions, or flats 11 are not limited to type shown, since other forms of thread removal or grooving substantially longitudinally with stud axis will also suffice. It will be noted in Fig. 3 that ends of thread 12 first to engage nut 6 are pointed or chamfered. By engaging stud slot 10 with a suitable tool, such as a screw driver, the stud is caused to be threaded into the nut by partial rotation. A quarter turn should be sufficient to tighten the joint. Slot 10 may also be observed to indicate position of the stud rotative engagement. Stud hollow 30 is intended primarily for lightness, though when desired, mechanism not shown in the drawing may be installed within to assist the stud to project above the cowling when disengaged.

Tolerances in the members to be joined may, however, prevent the stud to engage sufficiently, or the stud may perchance rotate freely into and out of engagement. It is therefore desirable that the nut be adjusted axially with respect to the stud. This is accomplished by progressive partial rotation of the adjustor 7, Fig. 6, either backward or forward. After the initial adjustment at assembly of the cowl to the structure is made, further adjustment will only be necessary because of the subsequent wear of the movable parts.

Adjustor 7 consists essentially of a band or a strip formed into a band. In spaced arrangement are provided trunnion slots 25 having a circumferential slope or rise approximately equal to the thread helix angle. The lower surface of the slots contain stepped notches, each notch 18 being made to correspond with its mating notch 18a. The upper surface of the slot 25 is a spring portion aligned with the slope of the notched surface below.

Adjustor 7 assembled between shoulders 15 and 16 of receptacle extension 26 also has assembled in the notched slots 25 the nut trunnions 13 which extend outwardly from nut 6. The spring section 19 is caused to hold the trunnion in any given notch firmly. Trunnions 13 are also contained in and project beyond receptacle slots 17 cut through sides of extension 26. Slots 17 also serve to prevent nut 6 from rotating about its axis. The trunnions 13 are free to be moved up or down in the slots 17, except as restrained by adjustor 7.

Partial rotation of the band 7 in either direction will cause the trunnioned nut 6 to rise or fall within the limits of adjustment provided by band notches 18.

Should, therefore, in the initial attachment of a cowl and stud assembly to a structure and receptacle assembly be made and the stud be found loose or incorrectly tightened and also noting the position of slot 10 in the stud, the cowl assembly may be removed for access to the receptacle assembly for adjustment. Application of a suitable tool such as a screw driver to slot 20, Fig. 6, or through use of a pair of pliers the band may be caused to rotate and simultaneously adjust the nut axially. Small adjustment only is required since the thread pitch itself may be relatively fine.

A fine thread pitch and a fine adjustment in the fastener will supply provision for the attaching of a cowl to a structure as securely as that presently obtained through the use of a nut and bolt combination. Tightness of the fastener not only assists prevention of the separation of the members joined in an axial direction to the stud, but also materially reduces slippage of the members fastened.

Oftentimes simple clearance holes for the stud are cut in member 1 or the cowl 2. More often, however, both members 1 and cowl 2 have the edges and the holes flared as at 27, Fig. 1. Flaring the members materially assists the fastener to resist slippage. Unfortunately, however, though reasonably close manufacturing control of tolerances between holes of a row may be exercised, and also that fastener components be carefully centered, it has been found desirable to provide a limited amount of side clearance in the fastener assembly to permit the nut to "float" sidewise in aligning itself with the stud.

The operation of screwing the stud into the nut and drawing the cowl and supporting structure tightly together will enable the flaring about the holes to transmit side load from one to the other with a minimum of slippage between the members and the clearance provided between nut and receptacle will reduce to a minimum cramping of the stud and nut.

The fastener assembly, Fig. 7, is a modified form of the assembly shown in Fig. 1.

The modification is centered mainly in the structure of the nut and adjustor. In the modified form, the nut has a multiplicity of ears or trunnions 23. The slots in receptacle 29 are made to correspond in number. The nut adjustor 28, Fig. 7, likewise has an equal multiplicity of slots with notches 22 designed to function in a manner similar to that of adjustor 7 of Fig. 1.

Having described my invention, I claim:

1. In a fastener, a receptacle containing a hollow cylindrical portion slotted axially with a pair of slots diametrically opposed, an adjustor comprising a circlet substantially encompassing said cylindrical portion and having perforations therethrough normal to the axis of said circlet in the form of slots circumferentially disposed, said slots oppositely paired, each said slot having an angular rise in corresponding angular directional relationship with the other said slot, the material of said circlet axially to one side of each said slot, relatively rigid, the material of said circlet axially to the other side of each said slot relatively resilient and exerting pressure against an arm of a fastener means extending thru a said slot of said hollow cylindrical portion and contained therebetween and at least one angular surface of each said adjustor slot containing steplike risers detent in character axially positioning said arm of a fastener means when restrained thereby and simultaneously positioning said circlet in locked mechanical engagement.

2. In combination, a fastener receptacle containing a hollow cylindrical portion shouldered at each end and including a plurality of axially disposed slots, a coaxial adjustor comprising an arcuate strip substantially encompassing said hollow portion yet restrained axially by said hollow portion ends, said strip having a plurality of perforations in the form of slots circumferentially disposed, each of said strip slots having a substantially helical rise in corresponding degree and directional relationship with another of said strip slots, the material of said arcuate strip contiguous to one side of at least one of said strip slots, relatively rigid in an axial direction and the material of said arcuate strip contiguous to the opposite side of said strip slot relatively resilient and exerting holding pressure against an arm of a fastener means projecting thru both a said hollow cylindrical portion wall slot and said arcuate strip slot when contained therebetween and at least one circumferential surface each of a said strip slot having steplike risers detent in character for positioning the said arm of the fastener means when restrained thereby and said strip coincidently restrained from rotative motion when not exerted upon by manual means.

3. In a fastener of the type described, a receptacle containing an annulus portion shouldered at each end, an adjustor comprising an arcuate strip, resilient in a circumferential direction, axially contained between said shoulders and having a plurality of slots circumferentially disposed, each said slot having a substantially helical rise in an axial and corresponding direction with the remaining said slots, the material of said strip axially to one side of each said slot, relatively inflexible in an axial direction and the material of said strip axially to the opposite side of the said slot, relatively resilient in an axial direction and exerting holding pressure against an arm of a fastener means contained between the said slot sides and at least one circumferential surface of each said slot having spaced impedimenta detent in character axially positioning a said arm of a fastener means when restrained thereby, the said strip capable of peripheral flexure, over a said shoulder and into said receiving annulus, said arms being continuations of a fastener element slidable within the said annulus and projecting thru axial perforations of the said annulus side wall, whereby manual partial rotation of the said strip will, within the axial limit of each said strip slot, axially position the said arms, and wherein cessation of manual manipulation of the said strip automatically restores said strip into locked rotational engagement.

CAREL T. TORRESEN.

REFERENCES CITED

The following references are of record in the file of this patent:

UNITED STATES PATENTS

| Number | Name | Date |
| --- | --- | --- |
| 289,379 | Blighton | Dec. 4, 1883 |
| 325,221 | Wright | Aug. 25, 1885 |
| 446,740 | Jones | Feb. 17, 1891 |
| 613,554 | Boggis | Nov. 1, 1898 |
| 827,230 | Goeppinger | July 31, 1906 |
| 1,052,179 | Robley | Feb. 4, 1913 |
| 1,845,882 | Litschge | Feb. 16, 1932 |
| 2,322,614 | Bedford, Jr. | June 22, 1943 |
| 2,368,799 | Barlow | Feb. 6, 1945 |
| 2,372,566 | Gazley | Mar. 27, 1945 |
| 2,374,679 | Hallock | May 1, 1945 |